(12) United States Patent
Martinetti et al.

(10) Patent No.: US 10,267,363 B2
(45) Date of Patent: Apr. 23, 2019

(54) GREASE DISPENSER DEVICE FOR ROLLING BEARINGS

(71) Applicant: Aktiebolaget SKF, Gothenburg (SE)

(72) Inventors: Maurizio Martinetti, Bruino (IT); Giuseppe Guala, Pinerolo (IT); Maurizio Patania, San Secondo di Pinerolo (IT); Massimiliano Ribet, Pomaretto (IT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/534,169

(22) PCT Filed: Dec. 15, 2015

(86) PCT No.: PCT/EP2015/079887
§ 371 (c)(1),
(2) Date: Jun. 8, 2017

(87) PCT Pub. No.: WO2016/096918
PCT Pub. Date: Jun. 23, 2016

(65) Prior Publication Data
US 2018/0258994 A1      Sep. 13, 2018

(30) Foreign Application Priority Data
Dec. 16, 2014   (IT) .............................. TO2014A1045

(51) Int. Cl.
| F16C 33/66 | (2006.01) |
| F16C 19/38 | (2006.01) |
| F16C 33/58 | (2006.01) |

(52) U.S. Cl.
CPC ........ F16C 33/6614 (2013.01); F16C 19/386 (2013.01); F16C 33/583 (2013.01);
(Continued)

(58) Field of Classification Search
CPC .............. F16C 33/6607; F16C 33/6614; F16C 33/6618; F16C 33/6629
See application file for complete search history.

(56) References Cited

U.S. PATENT DOCUMENTS 2,272,757 A * 2/1942 Tcker .................. F16C 33/6607
                                                       384/466
3,885,842 A    5/1975 Furutsu
(Continued)

FOREIGN PATENT DOCUMENTS

| JP | 2008095766 A | 4/2008 |
| WO | 2015000509 A1 | 1/2015 |

OTHER PUBLICATIONS

Machine Translation of JP 2008095766.*

*Primary Examiner* — Thomas R Hannon
(74) *Attorney, Agent, or Firm* — Bryan Peckjian; SKF USA Inc. Patent Dept.

(57) ABSTRACT

A rolling bearing includes a stationary radially outer ring, a groove, at least a rotatable radially inner ring, at least a plurality of rolling bodies, interposed between the radially outer ring and the radially inner ring and a grease dispenser device configured to be accommodated within the groove of the radially outer ring. The dispenser device is further provided with a radially outer crown on which at least a radially inner protrusion is rigidly fixed, the protrusion having a barrier function against a flow of grease.

9 Claims, 5 Drawing Sheets

(52) U.S. Cl.
CPC ...... *F16C 33/6618* (2013.01); *F16C 33/6629* (2013.01); *F16C 2226/74* (2013.01)

(56) References Cited

U.S. PATENT DOCUMENTS

| | | | |
|---|---|---|---|
| 3,940,191 A | | 2/1976 | Tomioka et al. |
| 4,199,203 A | * | 4/1980 | Pearson ............... F16C 23/086 |
| | | | 384/470 |
| 5,803,616 A | | 9/1998 | Persson et al. |
| 9,835,201 B2 | * | 12/2017 | Holsnijders ......... F16C 33/6611 |
| 9,850,952 B2 | * | 12/2017 | Holsnijders ......... F16C 33/6622 |

\* cited by examiner

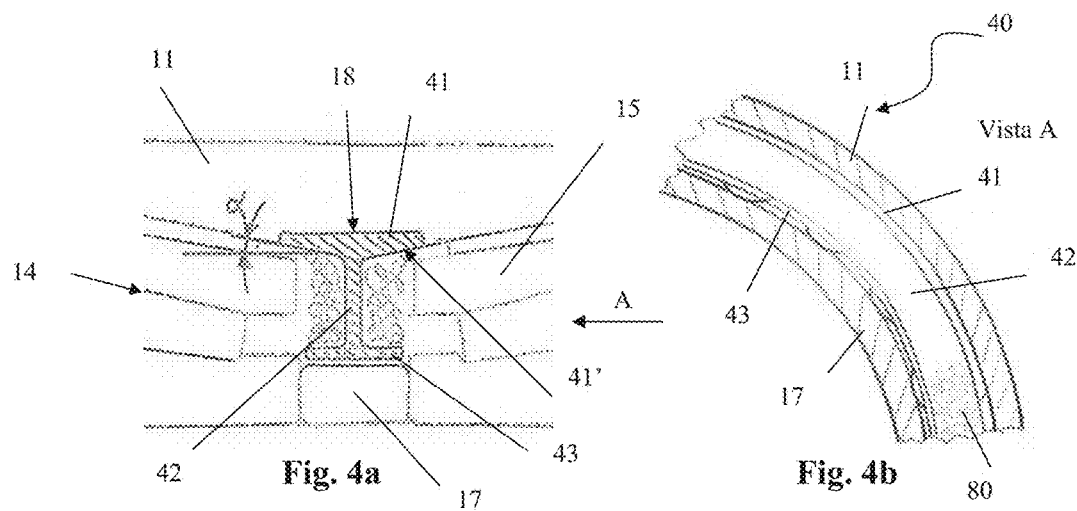
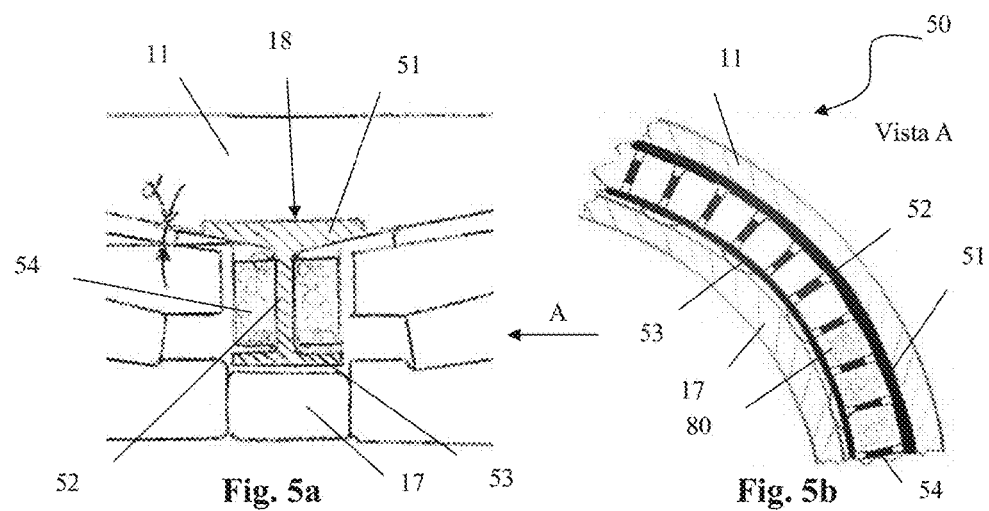

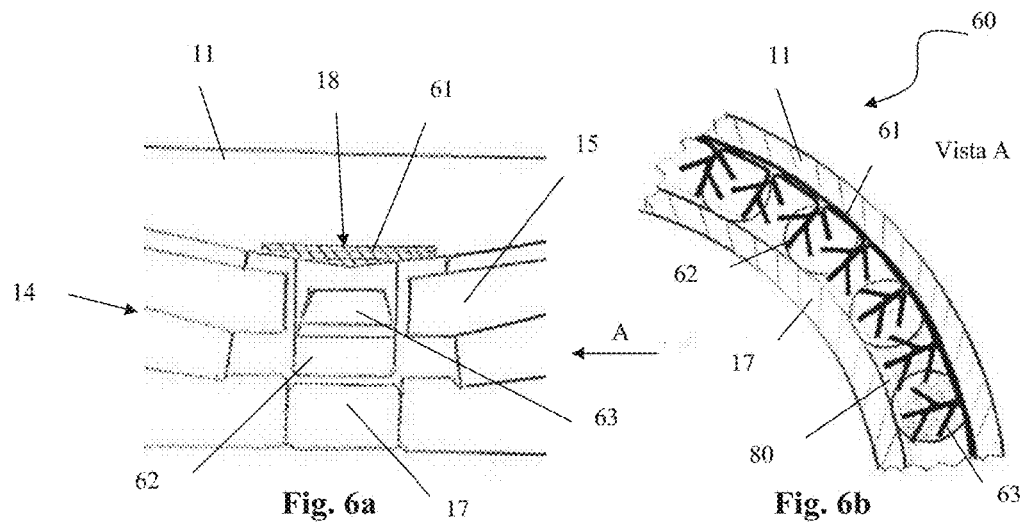
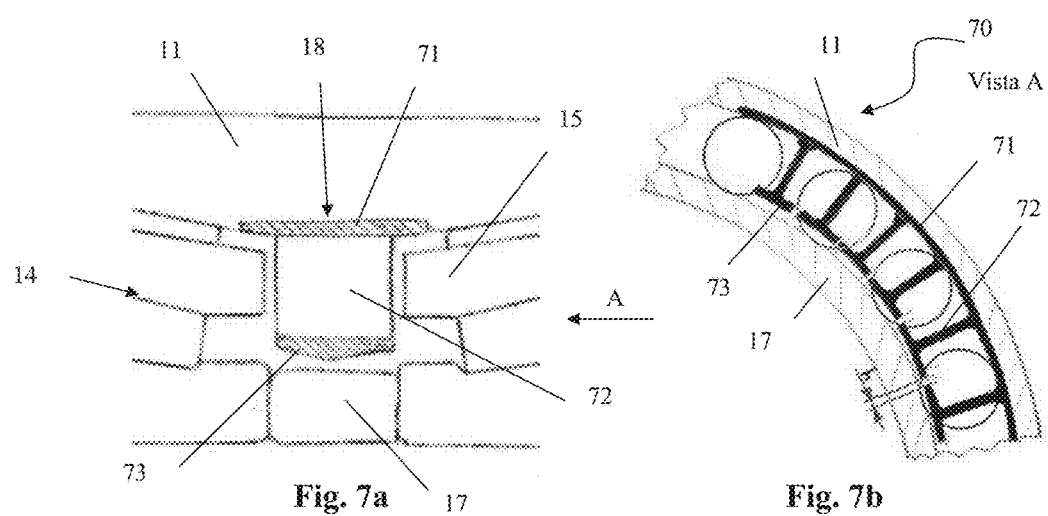
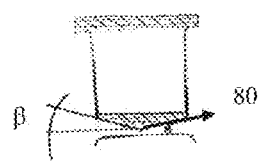

GREASE DISPENSER DEVICE FOR ROLLING BEARINGS

CROSS REFERENCE

This is a United States National Stage Application claiming the benefit of International Application Number PCT/EP2015/079887 filed on Dec. 15, 2015, which claims the benefit of Italian Patent Application TO2014A001045 filed on Dec. 16, 2014, both of which are incorporated herein by reference in their entireties.

FIELD OF THE INVENTION

The present invention relates to a grease dispenser device for a rolling bearing. More particularly, the device is suitable to retain the grease and subsequently to dispense it during the bearing life cycle.

The present invention is particularly suitable in the railway technology, wherein the used rolling bearings are of a significant size, having an internal bore comprised between 90 and 160 mm. The present invention is however applicable in all other sectors of the art, other not limitative application examples are in the field of the automotive or renewable sources. The invention has been conceived for application to bearings provided with rollers, in particular, a double row of rollers. For such bearings, the device can be assembled at the center between the two rows of rollers, working as a grease dispenser. Such applications include both the case in which the inner ring of the bearing is rotatable while the outer ring of the bearing is fixed and the opposite case. However, the dispenser device is also applicable in lateral position with respect to the rows of rolling bodies and on other types of rolling bearings.

BACKGROUND OF THE INVENTION

As known, any type of rolling bearing requires adequate lubrication during the operating conditions of its life cycle. Typically used are the kinds of grease based on mineral oil, thickened with lithium soap, which has good thermal stability, oxidation and mechanical properties as well as excellent water resistance and rust protection.

For example, in the case of bearings having a double row of rolling bodies, typically the grease is inserted in the central area comprised between the two rows. During the operating conditions of the bearing, the grease migrates between the various parts of the bearing in a completely random way, due to many factors, most of which are not controllable. The result is that often certain areas requiring a greater quantity lubrication receive few grease and tend to prematurely wear, while on the contrary the grease accumulates in areas requiring less lubrication causing unwanted friction losses.

Grease dispenser devices or lubricants cartridges are known. Purpose of said devices is to retain the grease, creating a sort of obstacle to its free outflow, and to provide the grease in a sufficiently controlled way during the working life of the bearing. For example in the document U.S. Pat. No. 5,803,616 a grease dispenser device is described, device which is mounted on the outer ring of the bearing, between the two rows of tapered rollers. Such devices generally have a honeycomb structure that, if on the one hand is effective in the retention of the grease, on the other hand to enable the delivery of grease, needs to be subjected to the action of the centrifugal force. This feature heavily restricts the use of such devices, being the cartridge able to be assembled only on the bearing rotatable ring.

Document JP 2008 095766 A discloses a wheel bearing constructed as a double-row rolling bearing in which predetermined grease is filled. An annular recessed site is formed on a shoulder portion of an outward member, and a wall member is mounted in the recessed site. The wall member has an annular protruded portion 14a integrally formed on an outer peripheral face and fitted to the recessed site, and a tapered face gradually diameter-expanded from the cross center toward the end and formed on the inner periphery. Thus, the grease filled in the bearing flows along the tapered face to double-row outside rolling surfaces with gravity and centrifugal force due to the rotation of the bearing.

BRIEF SUMMARY OF THE INVENTION

An object of the present invention is to provide a grease dispenser device that overcomes the drawbacks of the known devices. The device according to the invention is characterized by a plurality of surfaces suitable to obstacle the free flow of the fat and at the same time to dose it in a controlled manner, even in the absence of centrifugal force. Therefore, the dispenser device described below can also be assembled on the stationary ring of the bearing. Different shapes of the device are possible, all equally effective, based on a circular crown on which a plurality of radial protrusions is engaged.

According to another aim, the device can be easily snap mounted in a seat of the bearing ring. The crown can be formed in a flat shape and then folded before being snap-fit in the ring seat; alternatively, the foil may take the form of an open ring, with a diameter slightly greater than the diameter of the seat of the bearing ring.

According to a further object, the device may be prepared off-line, in a controlled environment, so as to guarantee maximum reliability.

This and other objects and advantages which will be better understood hereinafter are achieved according to an aspect of the invention by a grease dispenser device for rolling bearings as defined in the enclosed independent claim.

Further embodiments of the invention, preferred and/or particularly advantageous, are described according to the characteristics as in the enclosed dependent claims.

BRIEF DESCRIPTION OF THE SEVERAL VIEWS OF THE DRAWING

The invention will be now described by reference to the enclosed drawings, which show some non-limitative embodiments, namely:

FIGS. 4a, 4b are two views of a third embodiment of the grease dispenser device, FIGS. 5a, 5b are two views of a fourth embodiment of the grease dispenser device, FIGS. 6a, 6b are two views of a fifth embodiment of the grease dispenser device, FIGS. 7a, 7b, 7c are three views of a sixth embodiment of the grease dispenser device, FIG. 8 schematically shows the engagement system for of the grease dispenser device, according to a first embodiment of the invention, FIGS. 9a, 9b schematically show the engagement system of the grease dispenser device, according to an alternative embodiment of the invention.

DETAILED DESCRIPTION OF THE INVENTION

Figure 1:
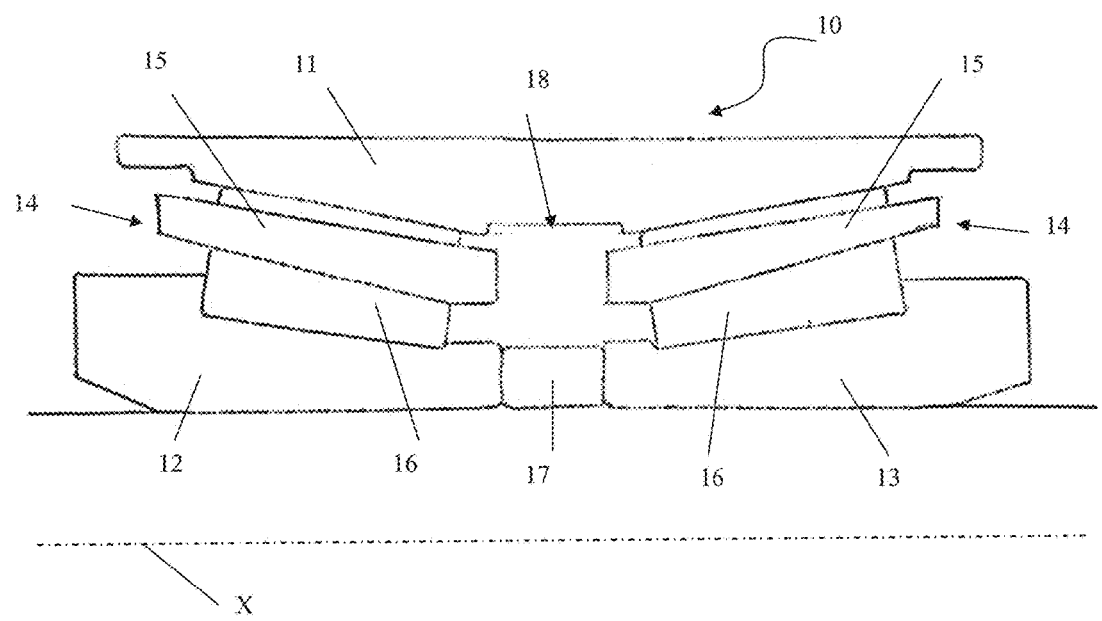
FIG. 1 is a schematic view in axial section of a bearing with double row of rollers, provided with a central groove to accommodate a grease dispenser device.

With reference to FIG. 1, a rollers rolling bearing is shown as a whole with 10. Throughout the present description and in the claims, terms and expressions indicating positions and directions, for example "radial" and "axial", are understood as referring to the axis of rotation X of the bearing unit 10. The below described example provides that the outer ring of the bearing is stationary, while the inner rings are rotatable. The present invention may however also apply to the opposite case, namely to a bearing with a stationary inner ring and a rotatable outer ring.

The bearing unit 10 comprises a stationary outer ring 11, a pair of inner rings 12, 13 rotatable and a double set of rolling bodies, in this example two groups 14 of tapered rollers interposed between the outer ring 11 and the inner rings 12, 13. Each group of tapered rollers includes a cage 15 and a plurality of tapered rollers 16. The cage 15 has the function to keep the tapered rollers 16 in place and in a position angularly equidistant between them. The inner rings are axially separated between them by a spacer 17. On the outer ring 11, in a radially outer position with respect to the central spacer 17, there is a groove 18, the dimensions of which depend on the type of application, in this example may be equal to 24 mm in axial direction and 2 mm in depth. The function of this groove is to accommodate by means of a snap assembly the grease dispenser device, as will be explained in the following.

The dispenser device according to the invention comprises a radially outer crown on which is engaged at least one radial protrusion. In particular, the radially outer crown can be connected to a plurality of radial blades or to a an annular and vertical wall, perpendicular to the plane containing the front section of the bearing. In turn, at the annular and vertical wall a plurality of lateral or radial protrusions may be connected. The outer crown can be folded and snap-fitted into the groove of the outer ring. The dispenser device can be realized in different materials and may take various shapes. In any case, the function of the dispenser device is to retain the grease inside it and to let it flow out during the bearing working life, dosing the grease in the most possible controlled way.

The outer crown can be realized according to a flat shape and then folded before being snap-fit in the ring seat; alternatively, the outer crown may take the form of an open ring, with a diameter slightly greater than the diameter of the bearing ring seat. The concept of snap-fitting, regardless of whether one starts from a flat shape or an open ring, is expressed in the elastic bending of the radially outer crown until its deformed shape can be inserted into the radial groove of the outer ring. When this operation is completed, that is when the device has been inserted in the groove of the outer ring, the elasticity of the material will cause the expansion of the outer crown against the groove of the outer ring ensuring a certain pressure on it. This will result in a stable assembly against the groove.

Figures 2A, 2B:
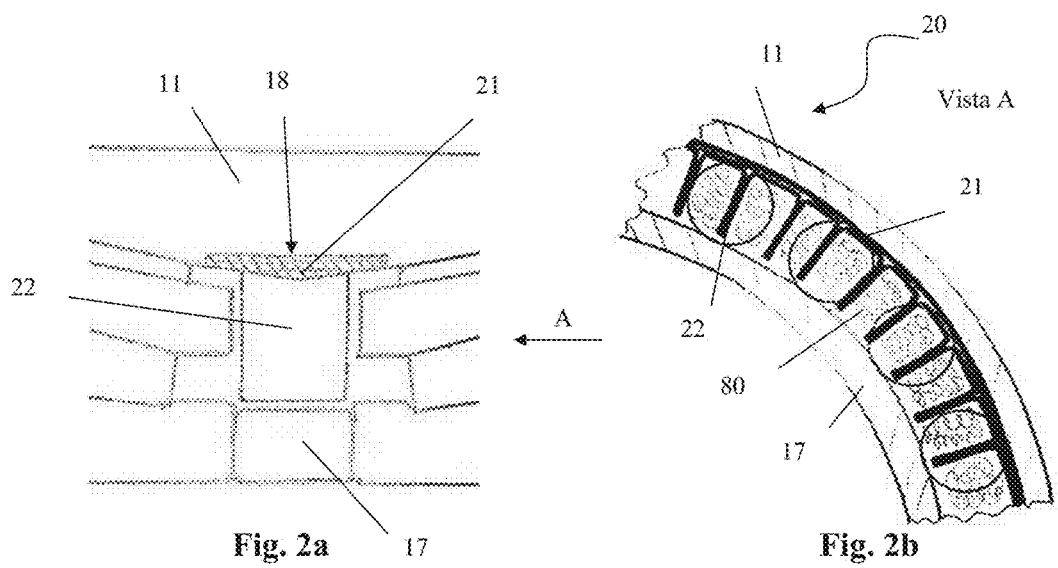
FIGS. 2a, 2b are two views of a preferred embodiment of the grease dispenser device according to the present invention.

A first embodiment of the dispenser device according to the invention is shown in FIGS. 2a and 2b.

The grease dispenser device 20 comprises a radially outer crown 21 which snaps into the groove 18 of the outer ring 11 of the bearing. Connected to the outer ring there is a plurality of radial blades 22 which extend in the radially inner direction, until touching the external diameter of the central spacer 17. The grease 80 is inserted between the various blades. Because the blades have a radial direction, the distance between two blades, measured at the height of the outer crown is greater than the distance between two blades measured at the base of the same blades: this defines a trapezoidal shaped area that retains grease more easily.

Figures 3A, 3B:
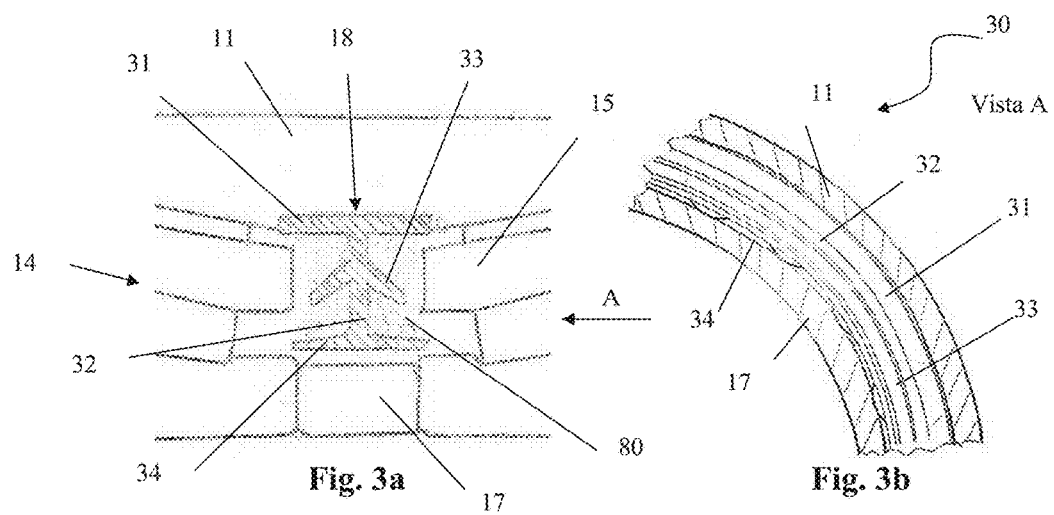
FIGS. 3a, 3b are two views of a second embodiment of the grease dispenser device.

A second embodiment of the dispenser device 30, according to the present invention is shown in FIGS. 3a and 3b.

The grease dispenser device 30 comprises a radially outer crown 31, which snaps into the groove 18 of the outer ring 11 of the bearing and is connected to an annular and vertical wall 32. Connected to the vertical wall there is a plurality of side branches radially outer 33 and radially inner 34. The grease 80 is retained by the branches 33, 34 of the device 30 and the ends of the branches are towards the group of tapered rollers 14 for conveying the grease in that area. In particular, the radially inner branches 34 tend to be inserted below the cage 15 in order to more efficiently convey the grease. The branches radially outer 33 are slightly inclined to facilitate the grease migration to the group of tapered rollers 14. The function of the vertical wall 32 is to prevent grease migration from a group of tapered rollers to the other, as well as to provide additional support to the grease. At the same time, the vertical wall 32 limits the migration of the grease if the bearing unit is vertically transported.

A third embodiment of the dispenser device 40, according to the present invention is shown in FIGS. 4a and 4b.

The grease metering device 40 comprises a radially outer crown 41 which snaps into the groove 18 of the outer ring 11 of the bearing and is connected to an annular and vertical wall 42, which is in turn connected to a radially inner crown 43. The function of the annular and vertical wall 42 is to prevent migration of the grease 80 from a group of tapered rollers to the other, as well as to provide additional support to the grease. At the same time, the vertical wall 42 limits the migration of the grease if the bearing unit is vertically transported. The inner surface 41' of the radially outer crown 41 is inclined with the same angle α of the outer ring 11 raceway. This provides an invitation to the oil of the grease to migrate to the outer ring raceway of the bearing. The radially inner crown 43 that faces the central spacer 17 has the function to contain the grease and to prevent the same grease from falling on the said spacer. The radially inner crown 43 also helps to direct the oil of the grease towards the groups of tapered rollers 14 below the cages 15.

A fourth embodiment of the dispenser device 50, according to the present invention is shown in FIGS. 5a and 5b.

The grease dispenser device 50 comprises a radially outer crown 51 that is snapped into the groove 18 of the outer ring 11 of the bearing and is connected to an annular and vertical wall 52, which is in turn connected to a radially inner crown 53. The device 50 is similar to the device 40, previously illustrated, and the corresponding components (inner and outer crown, vertical wall) obviously play the same functions. The device 50 differs from the previous one by the presence of a plurality of radial blades 54, connected to the annular and vertical wall 52, similar in shape and function to the radial blades of the embodiment of FIG. 2. In this way, the surfaces number able to retain the grease 80 increases, without changing the dosing effectiveness with respect to the device 40.

A fifth embodiment of the dispenser device 60, according to the present invention is shown in FIGS. 6a and 6b.

The grease dispenser device 60 comprises radially outer crown 61 that is snapped into the groove 18 of the outer ring 11 of the bearing. Connected to the outer crown there is a plurality of radial blades 62 which extend in the radially inner direction, until touching the external diameter of the central spacer 17. Compared to the solution represented by the dispenser device 20, this solution also comprises a plurality of panels 63 inclined and descending along a radially inner direction, connected to the plurality of radial blades 62. These panels 63 increase the contact surfaces. If the grease 80 slides, it may fall on the next panel and panels below can release grease into groups of tapered rollers 14.

A sixth embodiment of the dispenser device 70, according to the present invention is shown in FIGS. 7a, 7b and 7c.

The grease dispenser device 70 comprises a radially outer crown 71 that is snapped into the groove 18 of the outer ring 11 of the bearing. Connected to the outer crown there is a plurality of radial blades 72 which extend in the radially inner direction, at the base of said radial blades a plurality of fins 73 is connected. Between the fins is provided a light h which allows a controlled passage of the grease. The grease, that possibly may leak, goes into contact with the rotatable central spacer 17. The central spacer raises the grease towards the bottom of the fins of the device 70. Being slightly inclined (by an angle $\beta$, with respect to the axial direction), said fins push the grease 80 to enter the group of tapered rollers 14, below of the cages 15.

Figure 8:
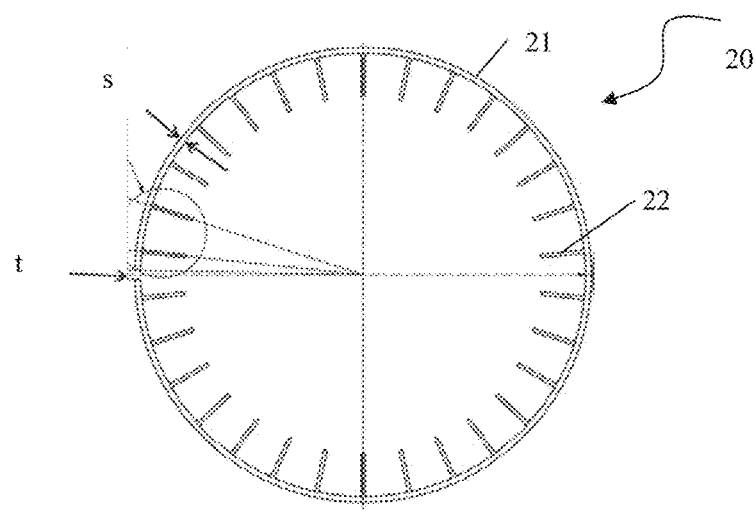

With reference to FIG. 8, the engagement system of the grease dispenser device is schematically illustrated. As a non-limiting example the dispenser device 20 will be taken, according to the first embodiment of the invention. It is evident that what will be said can also be applied to all other embodiments previously described.

The radially outer crown 21 of the dispenser device 20 is designed with a diameter slightly greater than the diameter of the groove 18 of the outer ring 11 of the bearing; moreover, there is a cut t that interrupts the radially outer crown 21, the cut providing the crown with a greater deformation capacity when inserted in the groove of the outer ring of the bearing. The thickness s and the cut t of the radially outer crown are important design parameters for such deformation capacity and for the subsequent sealing once introduced the dispenser device 20 in the groove 18 of the radially outer ring 11 of the bearing. The thickness s can be between 1 mm and 10 mm, while the cut t will preferably be less than 20 mm.

Figure 9A:
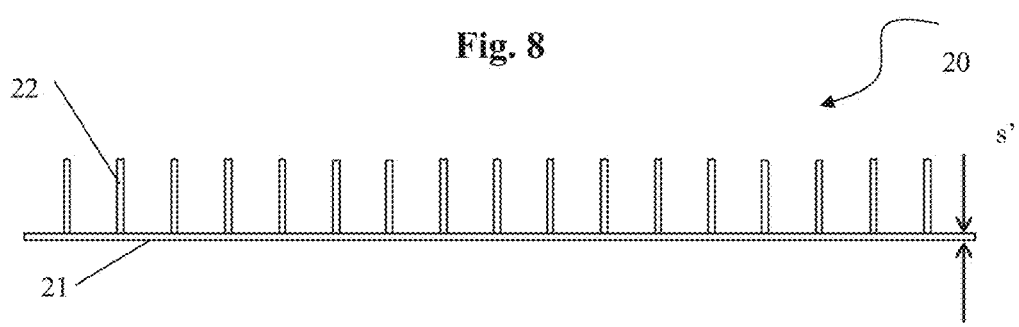
Figure 9B:
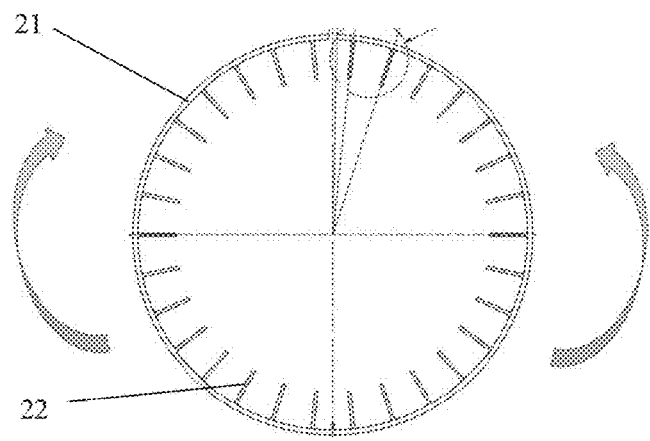

With reference to FIGS. 9a, 9b, an alternative engagement system of the grease dispenser device is schematically illustrated, always with reference to the dispenser device 20, according to the first embodiment.

The metering device 20 is designed with a radially outer crown 21 initially flat, represented horizontally in FIG. 9a. When assembled inside the outer ring 11 of the bearing, the crown 21 assumes a circular shape. Once introduced the so folded dispenser device 20 inside the outer ring of the bearing, the crown expands in the groove 18 of the outer ring 11, occupying the free space. The thickness s' of the outer crown is the important design parameter for such deformation capacity and subsequent sealing once introduced the device in the groove of the outer ring of the bearing. The thickness s' will advantageously be between 1 mm and 10 mm.

The adoption of a grease dispenser device, according to any one of the illustrated embodiments allows to obtain the following advantages: the possibility of introducing a greater amount of grease in the central area of the bearing, since the device offers a greater capacity for retention and stability of the grease. Grease stability has to be intended in terms of loads, vibrations and temperature, during the useful life of the bearing; the grease in the dispenser device will be released in the bearing in a more controlled manner, allowing effective lubrication for a longer time period and consequently increasing the maintenance intervals of the bearing.

In the attached figures, the dispenser device is applied to a bearing unit having tapered rollers and is mounted in a central position between the two rows of tapered rollers, but it should be understood that the device according to the present invention could also be mounted laterally to one or both the rows of tapered rollers.

Moreover, although the dispenser device has been illustrated in coupling with a tapered roller bearing, the same device according to the present invention may also be used with another different types of bearing: bearings having single or double row of rolling bodies, the rolling bodies being balls, rollers or other type.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A rolling bearing comprising:
 a radially outer ring having a central and circumferential groove on its inner surface;
 at least a rotatable radially inner ring;
 at least a plurality of rolling bodies interposed between the radially outer ring and the rotatable radially inner ring, wherein a grease dispenser device is configured to fit within the groove of the radially outer ring;
 wherein the dispenser device comprises a radially outer crown on which at least a radially inner protrusion is fixed, the protrusion having a barrier function against a flow of grease,
 wherein the at least a radially inner protrusion is a plurality of radial blades or an annular and vertical wall.

2. The rolling bearing according to claim 1, wherein the radially outer crown of the dispenser device has a diameter larger than the groove diameter, the crown being configured for a snap-in mounting in the groove of the radially outer ring.

3. The rolling bearing according to claim 1, further comprising a plurality of panels, inclined and descending along a radially inner direction, and connected to the plurality of radial blades of the dispenser device.

4. The rolling bearing according to claim 1, further comprising a plurality of fins connected to the radially inner end of the plurality of radial blades of the dispenser device, the fins having an inclination (β), with respect to the axial direction, and each pair of fins presenting a gap (h) between the two subsequent fins.

5. The rolling bearing according to claim 1, further comprising a plurality of lateral branches, radially external and radially internal, and connected to the annular and vertical wall.

6. The rolling bearing according to claim 1, further comprising a radially inner crown connected to the annular and vertical wall.

7. The rolling bearing according to claim 6, further comprising a plurality of radial blades fixed to the annular and vertical wall of the dispenser device.

8. The rolling bearing according to claim 1, wherein the radially outer crown of the dispenser device presents a cut, so that the radially outer crown is configured for the assembly inside the groove of the radially outer ring.

9. The rolling bearing according to claim 1, wherein the radially outer crown of the dispenser device has a flat shape and is configured to be folded, assuming a circular shape which is suitable for the assembly inside the groove of the radially outer ring.

* * * * *